United States Patent [19]

Link et al.

[11] Patent Number: 4,937,704
[45] Date of Patent: Jun. 26, 1990

[54] PANEL REJECTION FEATURE FOR TWIN CIRCUIT BREAKER

[75] Inventors: Donald A. Link, Hubertus; Dean A. Hubbard, Sussex; Michael R. Larsen, Milwaukee, all of Wis.

[73] Assignee: Eaton Corporation, Cleveland, Ohio

[21] Appl. No.: 263,317

[22] Filed: Oct. 27, 1988

[51] Int. Cl.$^5$ .............................. H02B 1/04
[52] U.S. Cl. .................. 361/354; 361/358; 361/376; 361/417; 361/419
[58] Field of Search ............... 200/293, 294; 361/346, 361/347, 350, 353, 354, 356–358, 360, 376, 417, 419–420

[56] References Cited

U.S. PATENT DOCUMENTS

| | | | |
|---|---|---|---|
| 3,218,519 | 11/1965 | Casey | 361/353 |
| 3,403,301 | 9/1968 | Mrowka et al. | 361/354 |
| 3,463,967 | 8/1969 | Klein | 361/353 |
| 3,611,048 | 10/1971 | Shelvik | 317/119 |

Primary Examiner—Gregory D. Thompson
Attorney, Agent, or Firm—L. G. Vande Zande

[57] ABSTRACT

Rejection of a twin circuit breaker at panelboard mounting positions not designated to receive a twin breaker is achieved by extending the hook of the twin breaker outwardly beyond the panelboard rail to prevent anchoring the outboard end of the twin breaker at non-designated positions, thereby indicating obviously improper installation. The rail is provided with outward extensions at designated mounting positions which do engage with the twin breaker hook to anchor the outboard end, such extension in a preferred embodiment being part of an adapter attached to the panelboard.

8 Claims, 4 Drawing Sheets

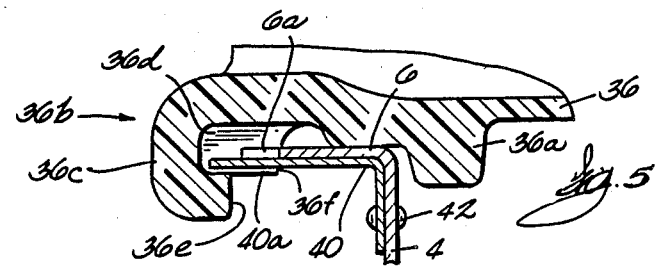
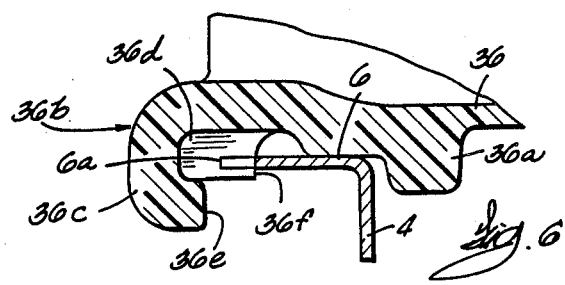
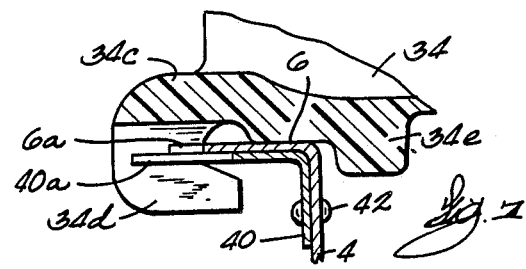
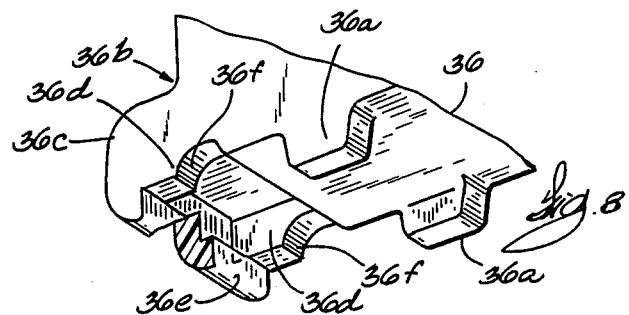

PANEL REJECTION FEATURE FOR TWIN CIRCUIT BREAKER

BACKGROUND OF THE INVENTION

This invention relates to lighting and appliance panelboards which receive a plurality of overcurrent protective circuit breaker devices thereon. More specifically, this invention relates to structure on the panelboard and on a twin circuit breaker which cooperate to provide a proper installation or an indication of an obviously improper installation position for a twin circuit breaker on the panelboard.

As used herein throughout the specification and claims, a twin circuit breaker shall mean a device comprising two independent circuit breaker mechanisms and circuits contained within a unitary housing having a width equal to that of a related single pole circuit breaker. Twin circuit breakers afford a doubling of protected branch circuits within respective single pole mounting positions of a panelboard and are commonly used to provide additional circuits on an already full panelboard. There is a practical limit to the number of circuits that can be added to a panelboard determined by the designed ampacity of the panelboard current carrying members. Thus, although circuit breaker manufacturers provide doubling up capability through the use of twin breakers, it is necessary to limit the number of twin circuit breakers by limiting the positions on the panelboard at which such twin circuit breakers may be installed. When, as in the invention disclosed in this application, the means for indicating proper or improper installation positions for twin breakers is structurally embodied in the attachment of the circuit breaker to the panelboard rail, the structure should also accept previously offered single pole circuit breaker versions at the restricted locations.

SUMMARY OF THE INVENTION

This invention provides a cooperative structural relationship between a hook on a twin circuit breaker and a mounting rail on a panelboard which functions to provide a proper mounting position on the panelboard for a twin circuit breaker. More specifically, the invention provides tabs which project beyond the lateral edge of the mounting rail and which are engaged by the hook portion of the twin circuit breaker to anchor that end of the circuit breaker to the panelboard. The hook extends sufficiently beyond the lateral edge of the rail so as not to engage the rail if a tab is not present, thereby not anchoring the hook end of the twin circuit breaker to the panel at mounting positions not having the tabs as an indication of obvious improper installation of the twin circuit breaker at such positions. The tabs may be provided by a separate adapter attached to the panelboard adjacent the mounting rail or may be formed integrally along the edge of the rail.

BRIEF DESCRIPTION OF THE DRAWINGS

FIG. 5 is a fragmentary cross sectional view of the cooperative structural relationship of this invention between a twin circuit breaker and the panelboard such as is shown in the left-handmost position of FIG. 3;

FIG. 6 is a fragmentary cross sectional view of the cooperative structural relationship of a twin circuit breaker and the panelboard such as is represented at the right-handmost position in FIG. 3;

FIG. 7 is a fragmentary cross sectional view of the mounting feature of a single pole, full width circuit breaker as shown in the intermediate position in FIG. 3;

FIG. 8 is an isometric view of the underside of a fragmentary portion of a twin circuit breaker showing the cooperative hook structure of this invention;

DETAILED DESCRIPTION OF THE PREFERRED EMBODIMENTS

Figure 1:
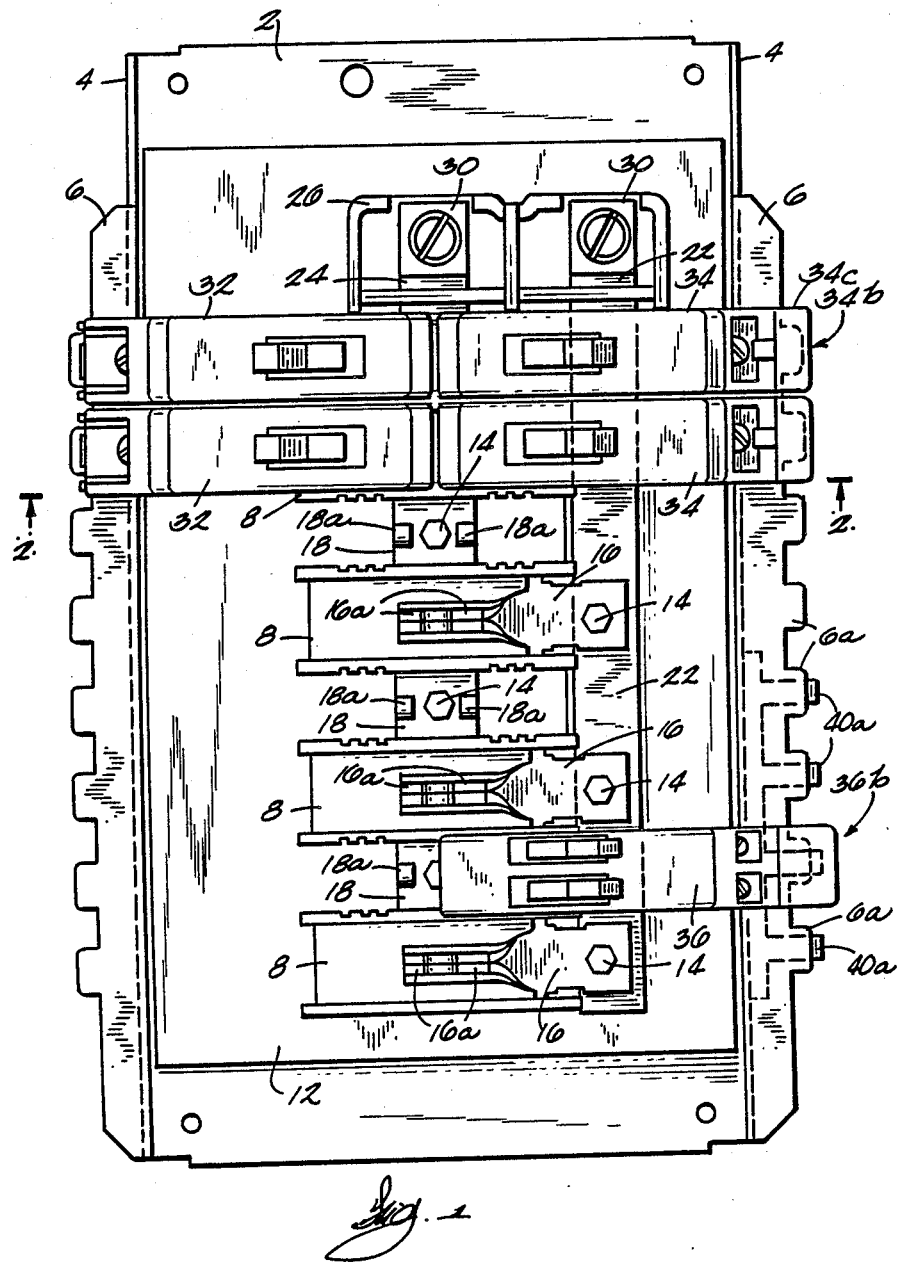
FIG. 1 is a front view of a circuit breaker panelboard constructed in accordance with this invention having a plurality of full width, single pole circuit breakers mounted in upper mounting positions and a twin circuit breaker mounted at a designated mounting position lower on the panelboard.
Figure 2:
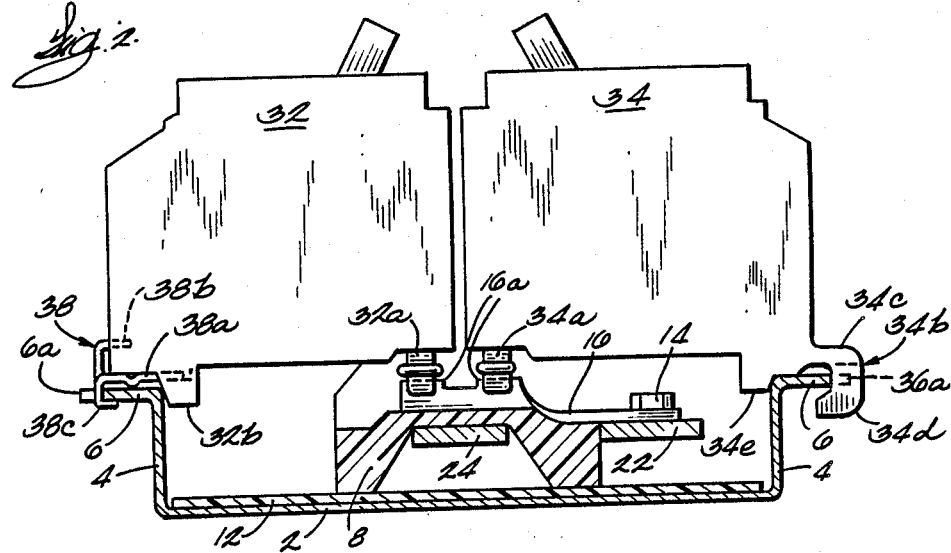
FIG. 2 is a cross sectional view of the panelboard taken along line 2—2 of FIG. 1 showing the single pole circuit breakers in elevation.

Referring to FIGS. 1 and 2 of the drawings, there is shown a panelboard for a circuit breaker load center, the panelboard being of the type disclosed and claimed in U.S. Pat. No. 3,611,048 issued Oct. 5, 1971 to Bertrum S. Shelvik and assigned, by mesne assignments, to the assignee of this application. U.S. Pat. No. 3,611,048 is incorporated herein by reference. The panelboard comprises a shallow, U-shaped sheet metal panel 2 having opposite upstanding sides 4, each of which terminate in outwardly extending rails 6 along the major portion of the length thereof. A plurality of molded insulating bases 8 and an insulating sheet 12 are secured to the central portion of the panel 2 with the insulating bases 8 being spaced apart in an aligned, vertically disposed row. Branch circuit electrical connector members 16 interlock with structural formations on insulating bases 8 to support outboard bus bar 22 to the row of insulating bases when attached to the respective connectors by screws 14. A second type of branch circuit connector 18 is positioned between adjacent insulating bases 8, the connector 18 resting upon formations (not shown) on the respective insulating bases. Screws 14 attach a second centrally disposed bus bar to the connectors 18 to support the bus bar 24 to the insulating bases 8. A substantially rectangular molded insulating head block 26 is disposed over the upper projecting ends of the respective bus bars 22 and 24 and is attached to the panel 2. Head block 26 has a pair of cavities aligned with the respective bus bars to form protective insulating pockets shrouding wire lug connectors 30 attached to the ends of the respective bus bars.

The arrangement of insulating base members 8 and branch circuit connectors 16 and 18 provide a plurality of contiguous regularly spaced transverse mounting positions for receiving circuit breakers 32, 34 and 36 at either side of a vertical center line of the panel The branch circuit connectors 16 and 18 have pairs of upstanding projections 16a and 18a, respectively, which are arranged in vertically aligned rows on either side of a vertical center line parallel with the side members 4 and rails 6. Each of the branch circuit connectors 16 and 18 define a pair of transversely extending mounting positions with the respective rails 6. As described in U.S. Pat. No. 3,611,048, the number of mounting locations may be increased by providing a panel extended at the bottom, longer bus bars 22 and 24, and additional insulating base members 8 and branch circuit connectors 16 and 18 arranged to provide additional regularly spaced, contiguous mounting positions.

The circuit breakers 32 and 34 are provided with a hook structure at their lower outboard corners and plug-in electrical terminal members 32a and 34a, respectively, depending from their lower inboard corners. The circuit breakers 32 and 34 are attached by engaging the respective hook structures over the outer edge of the respective rails 6 and pivoting the circuit breaker into the mounting position pocket defined by upstanding barriers of the insulating base members 8 to press the plug-on terminal member of the respective circuit breaker into engagement with a respective projection 16a, 18a of branch circuit connectors 16 and 18, respectively.

To maintain the outboard ends of the circuit breakers transversely aligned within the respective mounting position and thereby to prevent the outboard end of the circuit breaker from sagging downward along the rail 6 during use, the outer edge of each rail 6 may be formed to comprise a plurality of outwardly directed position tabs 6a at regular intervals centered on the transversely extending center line of each mounting position. The hook structure for circuit breaker 32 comprises a metal clip 38 having a main body portion 38a extending along the lower surface of circuit breaker 32 and hooked within positioning legs 32b depending from the lower surface of the housing of circuit breaker 32. An outer end of clip 38 is formed upwardly and inwardly to provide a hook 38b which is received within an opening of the circuit breaker housing to firmly attach that end of the clip to the circuit breaker. The lateral edges of clip 38 are formed into downwardly extending hooks 38c which straddle the positioning tab 6a and engage the outer edge of the respective rail 6, thereby anchoring the outboard end of circuit breaker 32 to the respective rail as well as preventing the outboard end of the breaker from sagging along the rail.

Circuit breaker 34 represents a later generation circuit breaker wherein the clips 38 have been replaced by an integrally molded hook structure 34b comprising an outwardly extending platform 34c from which a pair of spaced lateral hook shaped legs 34d depend to engage the outer edge of rail 6 on opposite sides of positioning tab 6a. Breaker 34 is also provided with depending positioning legs 34e corresponding to legs 32b of circuit breaker 32. The legs 32b and 34e engage the inboard edges of the rails 6 at the juncture thereof with side walls 4 of panel 2 to ensure that the respective breakers are firmly hooked onto the rail and are correctly laterally positioned within the mounting position to effect electrical connection between plug-in terminal means 32a and 34a, respectively, and connector members 16a and 18a when the inboard ends of the breakers are firmly pressed downwardly.

Each mounting position will accommodate a single pole full width circuit breaker on each side of the vertical center line of the panelboard. The number of branch circuits that can be protected by circuit breaker apparatus is determined by the number of mounting positions of the panelboard. In the event that it is desired to include additional circuits to a panelboard which has all mounting positions occupied, a twin circuit breaker 36 comprising two distinct circuit breaker devices within a common full width housing may be installed to the panelboard in place of a single pole, full width breaker. Reference may be had to our copending application Ser. No. 211,739 filed June 27, 1988 entitled "Twin Unit Circuit Breaker With Improved Magnet Structure" for a more detailed description of twin circuit breaker 36. However, a practical limit exists as to the number of circuits that may be added to a panelboard without exceeding the ampacity of that panelboard. Accordingly, it is desirable to provide a predetermined number of mounting positions at which twin circuit breakers may be properly installed and to provide rejection means to indicate obviously improper installation of a twin circuit breaker at a mounting position not designated to receive a twin circuit breaker.

This invention provides a twin circuit breaker 36 having depending positioning legs 36a corresponding to legs 32b and 34e of breakers 32 and 34, respectively, and a molded hook structure 36b comprising a depending, C-shaped hook portion 36c integrally molded with the circuit breaker housing at the lower outboard corner thereof. The side walls of the breaker housing extend to hook portion 36c, thereby providing end walls 36d adjacent hook portion 36c. As will be apparent when comparing FIGS. 5, 6 and 7, hook portion 36c extends further outboard than the edge of rail 6 so that the inboard edge 36e of the lower leg of C-shaped hook portion 36c is not engagable with the outer edge of rail 6 when the breaker is laterally positioned within the mounting position by the engagement of depending legs 36a with the juncture of side wall 4 and rail 6 of the panel. End walls 36d close off the ends of hook 36c to form a pocket open toward or facing the outer edge of the mounting rail. End walls 36d are stepped at 36f to engage the outer edge of the rail 6 when the breaker is positioned thereon, the edges 36f and depending legs 36a laterally positioning the breaker within the mounting position. In that position, the inboard edge 36e of hook 36c is spaced outwardly of the outer edge of rail 6 and therefor does not anchor or hook the outboard end of circuit breaker 36 to the rail. When the rail includes the locating tabs 6a, the side wall 36d straddle the tab 6a to vertically position that end of the breaker within the appropriate mounting position on the rail, but the inboard edge 36e of hook 36c is disposed outwardly of the end of tab 6a.

Figure 3:
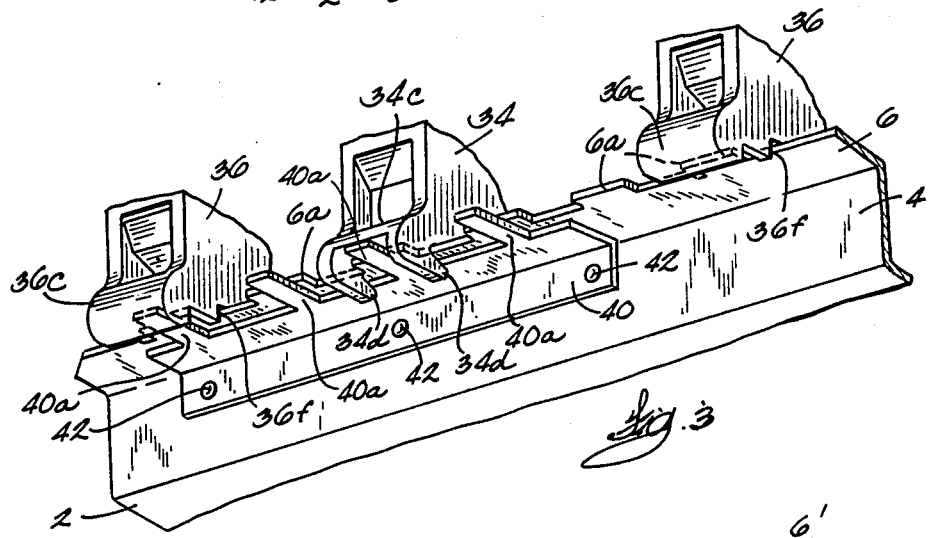
FIG. 3 is an isometric view seen from beneath the right-hand rail of the panelboard of FIG. 1 showing an adapter of this invention and portions of circuit breakers installed in particular mounting positions of the panelboard.
Figure 4:
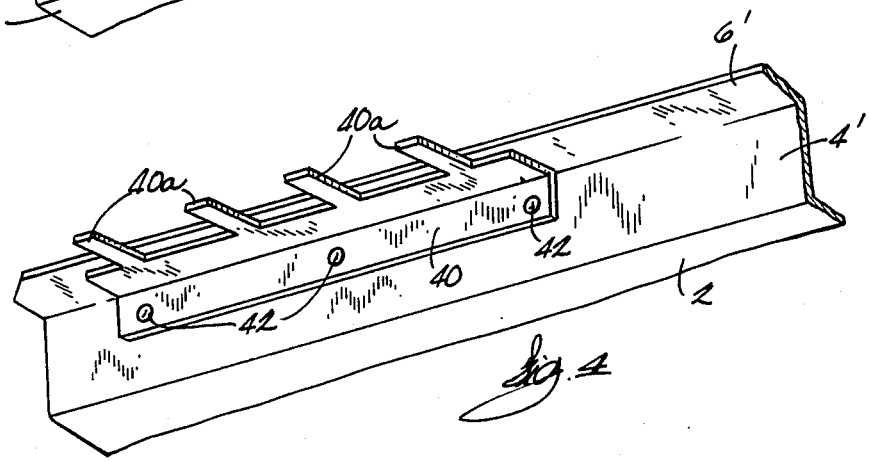
FIG. 4 is a view similar to FIG. 3 showing the adapter applied to a straight-edged mounting rail without circuit breakers positioned thereon.
Figure 9:
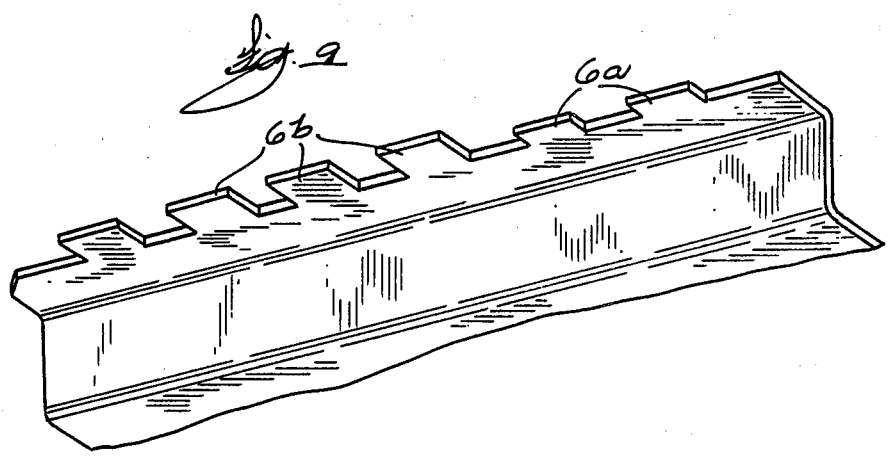
FIG. 9 is an isometric view seen from beneath the right-hand rail of the panelboard similar to FIG. 3, but showing a modified embodiment having two different length tabs.
Figure 10:
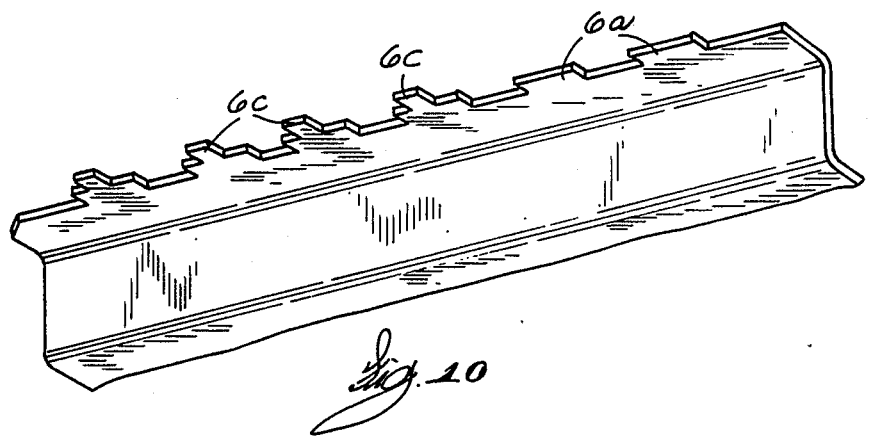
FIG. 10 is an isometric view seen from beneath the right-hand rail similar to FIG. 9, but showing a modified embodiment having a narrower integral distal end of selected tabs.

To provide mounting positions at which the twin circuit breaker may be properly installed, the tab 6a may be made longer at those positions 6b (FIG. 9) to extend sufficiently from the edge of the rail 6 so a be received within the pocket of hook structure 36b and engaged by the lower leg of hook portion 36c to thereby anchor the outboard end of twin circuit breaker 36 to the panelboard In a preferred embodiment an adapter 40 may be attached to a side rail 4 by a plurality of rivets 42 or the like as shown in FIGS. 3 and 4. An upper leg of adapter 40 underlies the adjacent rail 6 and has a plurality of tabs 40a extending outwardly thereof in alignment with the transverse center line of the mounting positions of panelboard 2. As seen in FIG. 3, tabs 40a extend beyond tabs 6a of rail 6 and are made somewhat narrower than tabs 6a. Alternatively, the projecting portion of tabs 40a could be formed integrally on rail 6 to extend from the end of tab 6a as narrower tabs 6c (FIG. 10). Referring to FIG. 4, the adapter 40 may be used with a panel rail 6' which is formed without locating tabs 6a, thereby providing a straight outer edge on the rail 6'.

The particular adapter 40 shown in FIG. 3 is a four position member which limits the lowermost four right-hand positions on the panelboard of FIG. 1 to be the only mounting positions on that panelboard at which a twin breaker can be properly installed. In any of these four positions the outboard end of twin circuit breaker 36 is hooked over the tab 40a such that it is engaged within the pocket of hook structure 36b to anchor the outboard end of circuit breaker to the panelboard. Subsequently the inboard end of twin breaker 36 is pivoted about the engagement of hook structure 36b and tab 40a to cause engagement of the plug-in terminals of circuit breaker 36 with the appropriate branch circuit connector, thereby anchoring the inboard end of the twin breaker as well. End walls 36d straddle tab 6a to maintain the outboard end of breaker 36 vertically aligned within the mounting position. The stepped edges 36f of end walls 36d abut the outer edge of rail 6 and depending positioning legs 6a extend inside the corner of rail 6 and side wall 4 to laterally position the twin circuit breaker 36 in the panel mounting position. When twin circuit breaker 36 is mounted at a mounting position that does not include the tab 40a or an equivalently extended tab 6a such as is represented at the right-hand-most position in FIG. 3, the legs 36a and edges 36f position that breaker such that the inboard edge 36e of the lower leg of C-shaped hook 36c is spaced outwardly of the respective tab 6a and does not engage the tab 6a as shown in FIG. 6. Thus the outboard end of twin breaker 36 cannot be anchored in the uppermost positions of the right-hand side of panel 2 or at any of the positions on the left-hand side of panel 2 as viewed in FIG. 1. The non-anchoring of the outboard end of a twin circuit breaker constitutes an indication of obviously improper installation of a twin circuit breaker at such mounting position to the installation. However, single pole circuit breakers may be mounted at any position of the panelboard as illustrated by example at the center position of FIG. 3 and in FIG. 7. Full width, single pole breaker 34 with molded hooks 34c is installed at that position, the hooks straddling both tabs 6a and 40a and engaging the outer edge of rail 6.

The foregoing has described a cooperating structural arrangement of a panelboard and twin circuit breaker which anchors the outboard end of that circuit breaker only at particular, predetermined mounting positions on the panelboard. Non-anchoring of the twin circuit breaker at other mounting positions on the panelboard indicates rejection by obvious improper installation of the circuit breaker at such positions. Although preferred embodiments of the invention have been disclosed, it is to be understood that the invention is susceptible of various modifications without departing from the scope of the appended claims.

We claim:

1. A panelboard and twin circuit breaker having a cooperative structural arrangement limiting mounting positions on said panelboard at which a twin circuit breaker may be installed comprising:
   a panelboard having a plurality of spaced electric power supply terminals aligned in a row and a rail spaced from and parallel to said aligned row of terminals, said rail having an outer edge facing transversely away from said terminals, each of said terminals defining a respective mounting position on said panelboard extending transversely between a respective one of said terminals and said rail;
   tab means projecting outwardly beyond said outer edge of said rail at selected mounting positions; and
   a twin circuit breaker having termination means at one end engaging a respective one of said supply terminals, means on said circuit breaker transversely locating said circuit breaker in a respective mounting position, and depending hook means at an opposite end of said circuit breaker, said hook means engaging said tab means securely attaching said opposite end of said circuit breaker to said rail at a selected mounting position, said hook means being spaced outwardly beyond said rail outer edge to prevent engagement of said rail by said hook means at a mounting position other than a selected mounting position.

2. A panelboard and twin circuit breaker having a cooperative structural arrangement limiting mounting positions on said panelboard at which a twin circuit breaker may be installed comprising:
   a panelboard having a plurality of spaced electric power supply terminals aligned in a row and a rail spaced from and parallel to said aligned row of terminals, said rail having an outer edge facing transversely away from said terminals, each of said terminals defining a respective mounting position on said panelboard extending transversely between a respective one of said terminals and said rail;
   tab means projecting outwardly beyond said outer edge of said rail at selected mounting positions;
   a twin circuit breaker having termination means at one end engaging a respective one of said supply terminals, means on said circuit breaker transversely locating said circuit breaker in a respective mounting position, and hook means at an opposite end of said circuit breaker disposed outwardly beyond said outer edge, said opposite end of said circuit breaker being secured to said rail only when said circuit breaker is in one of said selected mounting positions whereat said hook means engages said tab means; and
   wherein said tab means comprises a separate adapter affixed to said rail, said adapter having a tab projecting outwardly beyond said outer edge disposed at a respective selected mounting position.

3. A panelboard and circuit breaker defined in claim 2 wherein said adapter comprises a plurality of tabs spaced in coincidence with said mounting positions and defining a plurality of said selected mounting positions.

4. A panelboard and circuit breaker defined in claim 3 wherein said hook means comprises depending structure on said circuit breaker having a pocket therein open toward said outer edge, said pocket receiving a respective one of said tabs therein to secure said opposite end of said circuit breaker to said rail.

5. A panelboard and twin circuit breaker having a cooperative structural, arrangement limiting positions on said panelboard at which a twin circuit breaker may be installed comprising:

a panelboard having a mounting rail and a plurality of electric power supply terminals aligned in a row spaced from and parallel to said rail;

a plurality of tabs disposed at an outer edge of said rail, each of said tabs transversely aligned with a respective one of said terminals, each respective tab and aligned terminal defining a full width circuit breaker mounting position;

a full width molded case circuit breaker having termination means at one end engaging a terminal of a respective mounting position and a pair of hooks at an opposite end straddling a tab of a respective mounting position and engaging rail along and under said outer edge securely attaching said opposite end to said rail;

selected ones of said tabs having a greater outward extension from said outer edge of said rail than non-selected ones of said tabs, said selected ones of said tabs defining limited mounting positions;

a twin circuit breaker having a single termination at one end common to both circuits of said twin circuit breaker engaging a terminal of a respective limited mounting position and depending hook means at an opposite end, said hook means engaging a respective one of said selected tabs therein securely attaching said opposite end of said twin circuit breaker to said rail, said hook means being spaced outwardly from said rail outer edge beyond said non-selected ones of said tabs to prevent said hook means from engaging a non-selected tab when installation of said twin circuit breaker is attempted in a mounting position having a non-selected tab.

6. A panelboard and circuit breaker defined in claim 5 wherein said hook means comprises a pocket formed in a depending structure of said twin circuit breaker, side walls of said structure defining said pocket straddling a respective selected tab engaging opposite transversely extending edges thereof.

7. A panelboard and circuit breaker defined in claim 6 wherein said side walls comprise a stepped edge abutting said rail outer edge transversely positioning said twin circuit breaker with respect to said rail outer edge.

8. A panelboard and circuit breaker defined in claim 5 wherein said greater outward extension of said selected ones of said tabs comprises an adapter affixed to said rail having a plurality of second tabs aligned with respective selected ones of said tabs and extending beyond outer ends of said selected ones of said tabs.

* * * * *